United States Patent [19]
Grote et al.

[11] Patent Number: 5,760,501
[45] Date of Patent: Jun. 2, 1998

[54] COMPRESSION DRIVER MOTOR STRUCTURE

[75] Inventors: Warren H. Grote; Vern Bertelsman, both of Florissant; Joseph A. Ferrante, Ballwin, all of Mo.; Bruce Marlin, Hope, Ark.

[73] Assignee: American Trading and Production Corporation, Baltimore, Md.

[21] Appl. No.: 623,132

[22] Filed: Mar. 28, 1996

[51] Int. Cl.⁶ .................. H02K 41/00; H02K 33/16
[52] U.S. Cl. .................................. 310/13; 310/15
[58] Field of Search ...................... 310/12, 13, 15, 310/42

[56] References Cited

U.S. PATENT DOCUMENTS

| | | | |
|---|---|---|---|
| 3,873,784 | 3/1975 | Doschek | 179/115.5 PV |
| 3,886,419 | 5/1975 | Omura et al. | 310/15 |
| 3,984,706 | 10/1976 | Inouye | 310/12 |
| 4,336,425 | 6/1982 | Renkus | 179/115.5 H |
| 4,425,534 | 1/1984 | Perahia | 310/12 |
| 4,454,927 | 6/1984 | Seebinger | 181/152 |
| 4,494,022 | 1/1985 | Kawara et al. | 310/13 |
| 4,531,608 | 7/1985 | Heinz | 181/172 |
| 4,568,845 | 2/1986 | Uehara | 310/13 |
| 5,157,731 | 10/1992 | Mitobe | 381/202 |

Primary Examiner—Clayton E. Laballe
Attorney, Agent, or Firm—J. Andrew McKinney, Jr.

[57] ABSTRACT

A structure for a compression driver motor assembly which utilizes a pot with an integral top plate and a pole cap, thereby reducing magnetic losses and permitting manufacture of a driver structure with fewer parts and reduced weight. A more efficient process for manufacture of the motor assembly is also disclosed. The pot is manufactured with an integral top plate which is adapted for use with a large pole cap. The pole cap is affixed to the top of a permanent magnet and forms the magnetic gap with the top of the pot. The magnetic circuit of the driver thus includes a permanent magnet, a pot, a magnetic gap and the pole cap. The motor assembly is assembled in a process requiring fewer steps and less elaborate tooling than the motor assembly of the prior art.

9 Claims, 3 Drawing Sheets

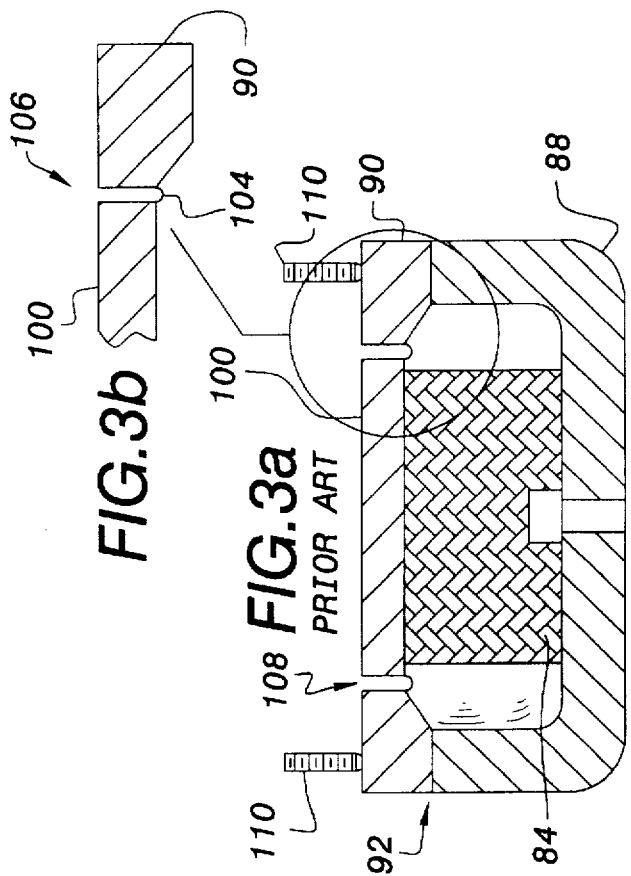
FIG. 3a PRIOR ART
FIG. 3b
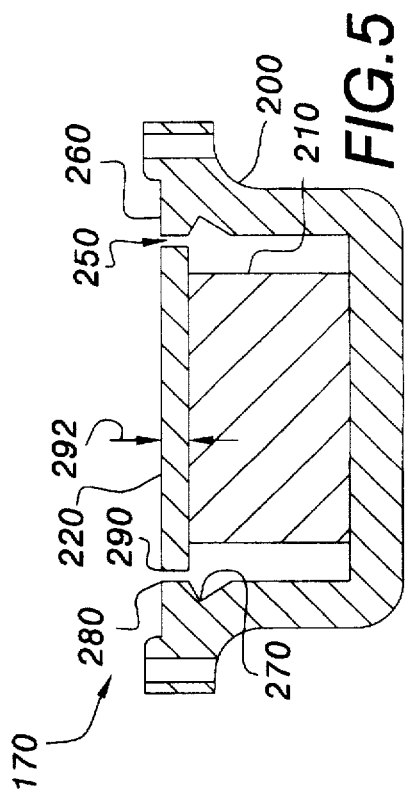
FIG. 5
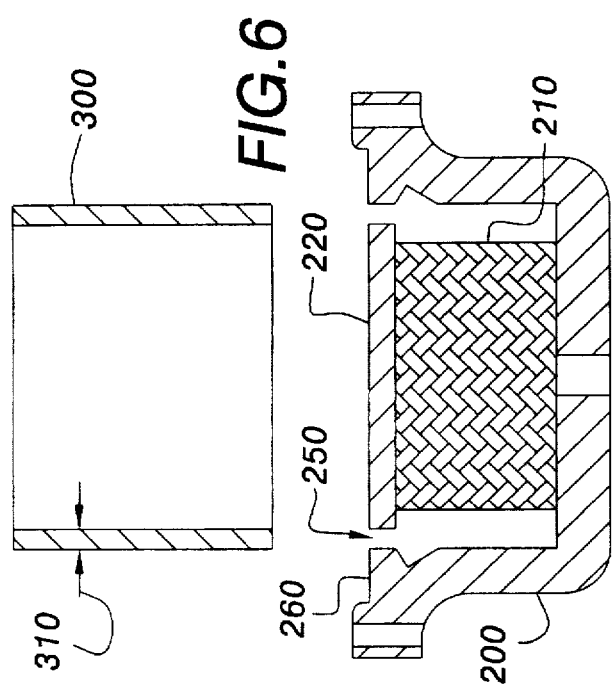
FIG. 6
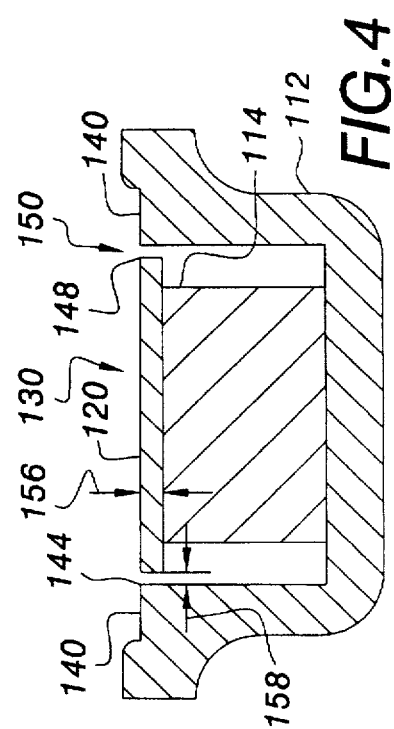
FIG. 4

COMPRESSION DRIVER MOTOR STRUCTURE

FIELD OF THE INVENTION

The present invention is directed generally to a structure and a method for making a compression driver for use in a siren, or the like. More particularly, the present invention is directed to a motor assembly, for use in a compression driver, which includes fewer parts, is more economical in assembly, weighs less and has an improved magnetic circuit as compared to the motor assembly of the prior art. Most specifically, the present invention is directed to a motor assembly having a pot with an integral top plate, thereby reducing magnetic losses at the pot-to-top plate transition and permitting efficient assembly of a motor assembly with fewer component parts and reduced weight.

DESCRIPTION OF THE PRIOR ART

Siren loudspeakers are well known for use in emergency communications and signalling as well as community warning, alarm, and public address applications. A typical siren loudspeaker includes a compression driver and a horn for directing the acoustic output of the siren. Compression drivers for use in sirens are known in the prior art.

In prior art drivers, the driver motor structure includes a diaphragm with a voice coil which is suspended in a magnetic gap. The motor structure includes a permanent magnet which is situated within a pot. An annular top plate is affixed to the open top of the pot and a pole cap is affixed to the top of the magnet; the pot, magnet, top plate and pole cap comprise a motor assembly. The magnetic gap is an annular concentric opening between the pole cap and the top plate. This gap is designed to concentrate magnetic flux from the permanent magnet into a region where it will be focussed onto the voice coil.

The magnetic flux travels through what may be termed a magnetic circuit wherein lines of magnetic flux travel within the elements of the driver motor in closed loops. One loop begins within the permanent magnet, travels down into the center of the pot, proceeds radially through the pot wall up to and through the interface with the top plate, travels radially through the top plate, proceeds across and through the magnetic gap, and radially through the pole cap to its center and back into the permanent magnet. The magnetic circuit thus includes the permanent magnet, the pot, the interface between the pot and the top plate, the magnetic gap and the pole cap.

Since this driver motor structure includes an interface or joint between the pot and top plate, the pot and top plate must be bonded or fastened together. However, the joint, if bonded, includes entrapped air, and in addition most bonding agents, such as epoxy, have poor magnetic properties. Accordingly, the interface can be detrimental to the performance of the driver motor, since the efficiency of the magnetic circuit may be diminished by poor magnetic performance at the interface.

Other problems with the driver motor structures of the prior art are that they are heavy, contain many component parts and are expensive to manufacture, due to complex procedures for assembly. Accordingly, there is a need for lighter driver motors having fewer component parts and which are less expensive to manufacture, and which overcome the limitations of prior art drivers. The compression driver motor structure of the present invention overcomes these limitations and provides a significant advance in the art.

SUMMARY OF THE INVENTION

It is an object of the present invention to provide a compression driver motor structure with greater magnetic circuit efficiency.

Another object of the present invention is to provide a compression driver motor assembly with fewer component parts.

A further object of the present invention is to provide a compression driver motor assembly which is less expensive to manufacture and which permits a simpler, less time consuming, assembly process.

An additional object of the present invention is to provide a compression driver motor assembly which weighs less than the motor assemblies of the prior art.

Briefly, the driver structure of the present invention utilizes a pot with an integral top plate and a pole cap, thereby reducing magnetic losses at the pot-to-top plate transition and permitting manufacture of a driver structure with at least one less part and reduced weight. The pole cap is affixed to the top of a permanent magnet and forms the magnetic gap with the integral top plate at the top of the pot.

This structure eliminates the source of poor magnetic performance at the interface, which was discussed above, so that the magnetic circuit of the driver of the present invention includes only the permanent magnet, the pot, the magnetic gap and the pole cap. In the preferred embodiment, the top inside diameter of the pot is machined to a shape which focuses and increases the flux density across the magnetic gap and reduces the fringing flux which can lead to reduced driver efficiency.

The assembly process for the motor assembly of the present invention includes the steps of bonding the magnet in the pot; placing a reusable cylindrical gap gauge in the pot; placing the pole cap within the gap gauge (thus automatically centering it) bonding the pole cap onto the magnet; and removing the gap gauge for reuse.

BRIEF DESCRIPTION OF THE DRAWINGS

While the novel features of the driver structure of the present invention are set forth with particularity in the appended claims, a full and complete understanding of the invention may be had by referring to the following detailed description and the accompanying drawings in which:

FIG. 3A illustrates the elements used in the assembly process for the motor assembly of the prior art;

FIG. 3B is an enlarged view of a portion of FIG. 3A;

FIG. 4 is a cross-sectional view of a pot, magnet and pole cap for a first embodiment of a driver in accordance with the present invention;

FIG. 5 is a cross-sectional view of a pot, magnet and pole cap for a second embodiment of the driver of the present invention; and FIG. 6 is a cross sectional view of the pot, magnet, pole cap and cylindrical gap gauge for use in assembly of the driver of the present invention.

DETAILED DESCRIPTION

Figure 1:
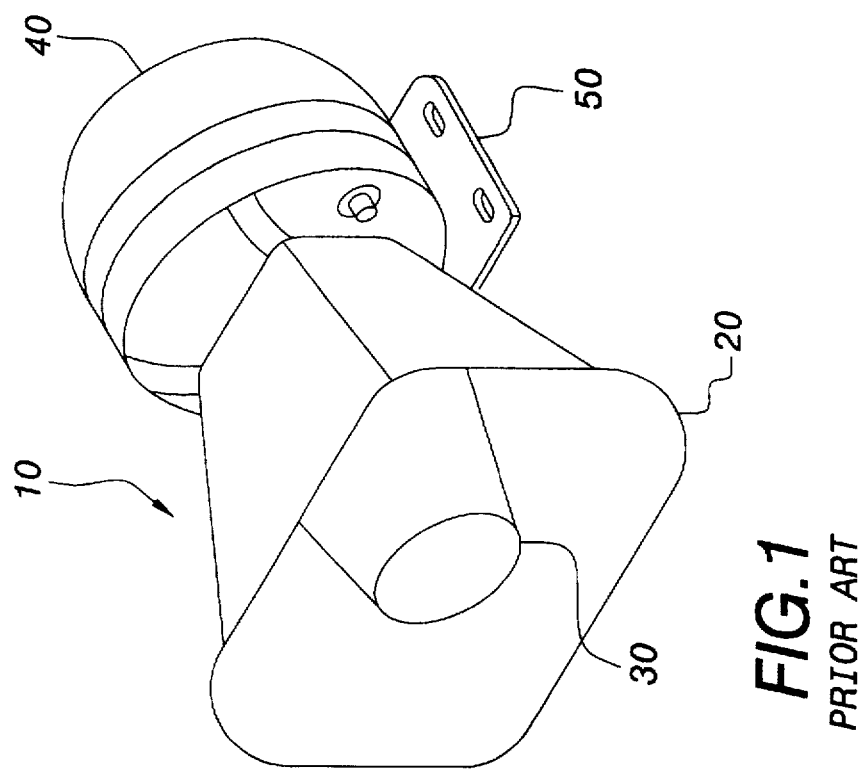
FIG. 1 is a perspective view of a siren having a compression driver, as is known in the prior art.

Referring initially to FIG. 1, there may be seen generally at 10 a perspective view of a conventional siren with a horn 20, a re-entrant tip assembly 30, a compression driver 40 and a mounting bracket 50.

Figure 2:
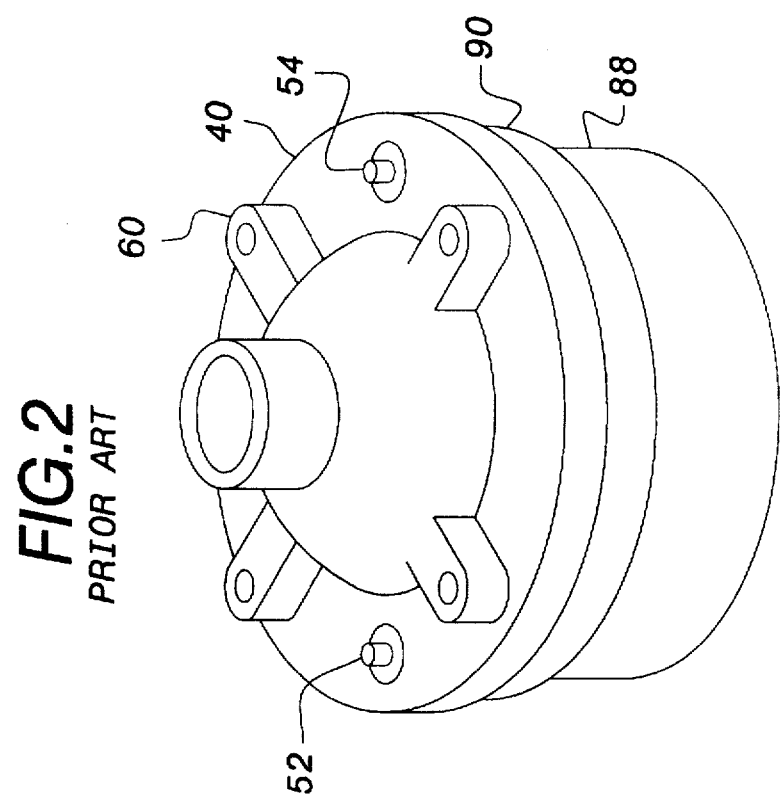
FIG. 2 is a perspective view of a compression driver for the siren illustrated in FIG. 1.

The compression driver 40, which is illustrated in FIG. 2, in a perspective view, is essentially a transducer for efficiently converting electrical signals to acoustic vibrations. The driver includes terminals 52 and 54 for connection to an electrical signal source, and as illustrated in the cross-sectional view of FIG. 3 also includes a sound chamber cover 60, a diaphragm assembly 64, and a motor assembly 70. The diaphragm assembly 64 includes a hemispherical diaphragm 72, an attached annular suspension 74, a cylindrical voice coil former 76, and a voice coil 80 which is wound from wire onto the former 76.

The motor assembly 70 of the prior art driver includes a permanent magnet 84, a cup-shaped pot 88, an annular top plate 90, and a circular pole cap 94. The pot 88 and top plate 90 are joined at an interface 92, which is included in the path of the closed loop of magnetic flux 96 for the driver. An annular magnetic gap 98 is formed between the outer diameter 100 of the pole cap and the inner diameter 102 of the top plate. When the driver is assembled, the voice coil 80 is suspended within the magnetic gap 98. The width of magnetic gap 98 is small in order to produce improved focus of the magnetic field in the gap and thus on the voice coil and so it is important that the manufacturing tolerances be tightly controlled in making the driver assembly. The manufacturing tolerances for the width of the gap, which is defined as the distance between the outer diameter 100 of the pole cap 94 and the inner diameter 102 of the top plate 90, are preferably (plus or minus) 0.002 inches. These tight tolerances require careful and expensive machining steps in making the pole cap and the top plate and also require an assembly process having many steps and requiring elaborate tooling.

FIG. 3A illustrates the elements used in assembly of the motor assembly 70 of the prior art.

Figure 3:
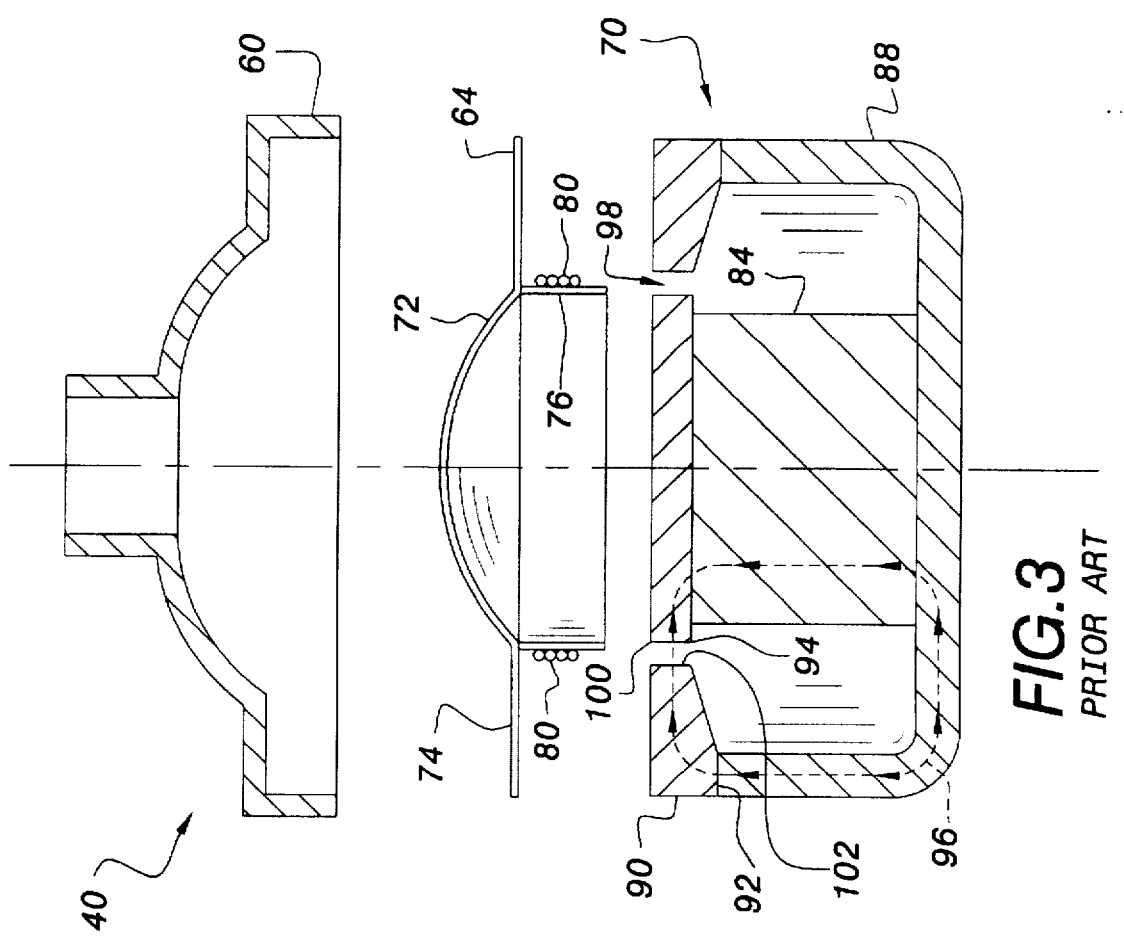
FIG. 3 is an exploded, cross-sectional view of the driver of FIG. 2.

The assembly process for the motor assembly 70 of FIGS. 2 and 3 begins with the placing of a pole cap 100, a top plate 90 and a pressure ring 104 into a hydraulic press. These three parts are coaxially aligned and press fit together into a concentric top plate assembly 106, having a concentric gap 108, as maintained by the pressure ring. Next, a pot 88, a magnet 84, the top plate assembly 106, and a quantity of adhesive, and first and second studs 110 for locating the top plate assembly on the pot are assembled by first bonding the magnet in the pot, and then threading the first and second locating studs 110 into the top plate assembly 106. Next, the top plate assembly 106 is positioned on the pot using the studs and the top plate assembly is bonded onto the magnet and pot to form a bonded interface 92.

This two-part process thus includes a first assembly process for making the top plate assembly 106 and a second assembly process for making the motor assembly 70 by adding the top plate, magnet and pot. The first assembly is implemented by one operator using a hydraulic press and takes 1.2 minutes per top plate assembly. The second assembly is also implemented by one operator and takes an additional 1.2 minutes per unit (per motor assembly). Thus, the total time required to assemble a motor assembly (in the prior art) is 2.4 minutes.

In the prior art, a number of materials having high magnetic permeability have been used to make the motor assembly components. For example, one compression driver has a pot which is molded under heat and pressure from powdered metal. This process is expensive, but results in a high precision component part. Pots have also been fabricated from deep drawn steel or cast iron. These processes are less expensive but produce component parts with less precise tolerances. Pots fabricated using less expensive processes, such as sand casting of iron, can be fitted with a machined top plate. The cost savings of using a sand cast pot are offset, somewhat, by the need to use a machined top plate which must be fitted in the assembly process discussed above.

The present invention, by way of contrast, requires no fitting of a separate machined top plate. FIG. 4 illustrates a cross sectional view of a pot 112, magnet 114 and pole cap 120 for a first embodiment of the driver motor assembly of the present invention 130. In this embodiment, the pot 112 includes an integral portion 140 which functions as a top plate; for clarity of nomenclature, this is referred to as an integral top plate. Integral top plate 140 has a continuous, circular inside diameter surface 144 which is machined to form a bore of high precision. The circular, continuous outside diameter surface 148 of pole cap 120 forms an annular magnetic gap 150 to receive a voice coil. The thickness of the pole cap 156 defines the length of the magnetic gap, since that is the length of the region of high magnetic flux density in the gap. The width of the magnetic gap 158 is determined by the diameter of the pole cap, for a given integral top plate inside diameter 144.

An alternative embodiment is illustrated in FIG. 5, which is a cross sectional view of a motor assembly 170 including a pot 200, magnet 210 and pole cap 220. This embodiment is adapted to more effectively focus magnetic flux in the magnetic gap 250. This pot includes an integral top plate 260 which includes a groove 270 which undercuts the inside diameter surface 280 of the integral top plate.

As discussed above, motor assembly 170 has a magnetic gap 250 for exciting a voice coil, and has a pot 200 with an integral top plate 260. The integral top plate has a circular inside diameter surface 280 which defines an outer edge of the annular magnetic gap 250. The pole cap 220 is affixed to the magnet 210 and has an outside diameter surface 290 which defines an inner edge of the magnetic gap 250. The width of the gap is defined as the difference between the radius for inside diameter surface 280 and the outside diameter surface 290. The length of the gap is defined as the thickness 292 of the top plate 220. In the preferred embodiment, the undercut groove 270 is approximately Vee shaped and leaves an inside diameter surface 280 which is coextensive in thickness with the top plate. This makes the entire magnetic gap length function to focus the magnetic field in the gap and reduces fringing flux which deviates from a straight path through the gap.

For the embodiments of both FIGS. 4 and 5, the pot is preferably cast in iron using a sand-casting process. Next, the inside diameter of the pot is cylinder bored. In making the embodiment of FIG. 6, another step is added; the undercut groove 270 is machined into the pot 200 using a computer numerically controlled (CNC) machine tool.

The manufacturing tolerances for the dimensions of the outer diameter 148 of the pole cap 120 and the inner diameter 144 of the integral top plate 140 are, again, preferably (plus or minus) 0.002 inches. These tight tolerances require machining steps for making the integral top plate bore only. The resulting motor assembly requires an assembly process having fewer steps and requiring less elaborate tooling. The assembly for the motor assembly 170, as illustrated FIG. 6 includes five parts, a pot 200, a magnet 210, a pole cap 220, a reusable cylindrical gap gauge 300, and adhesive.

The gap gauge 300 is a dimensionally stable cylindrical gauge tool having a uniform chosen thickness 310, which is precisely the desired thickness (i.e. radial width) of the annular magnetic gap 250. The gap gauge fits snugly within the cylinder bore of the pot 200. The pole cap 220 also fits snugly within the interior of the gap gauge and is centered thereby.

The assembly process for the motor assembly 170 of FIG. 5 includes the steps of placing and adhesively bonding the magnet 210 in the pot 200, placing the gap gauge 300 within the bore in the pot 200, placing the pole cap 220 within the gap gauge 300 and adhesively bonding the pole cap onto the magnet, and removing the gap gauge for reuse.

This process is accomplished by one operator in 0.75 minutes per motor assembly. Thus, the total labor savings due to the new structure and process, as compared to the prior art, is 1.65 minutes per motor assembly. In addition, there is, at present, a cost of materials savings of $3.50 per motor assembly.

Although a description in accordance with the present invention has been set forth fully and completely hereinabove, it will be apparent to one of skill in the art that a number of changes could be made without departing from the scope of the present invention. For example, while in the preferred embodiment of the pot, a pole cap having a rectangular cross section is shown, other cross sectional shapes could be substituted, so long as the gap's width is uniform over the gap's length; in such cases, the length of the magnetic gap is defined by the thickness of the pole cap at its outside diameter surface. Similarly, other shapes for the integral top plate can also be used, both with and without undercut grooves. Other shapes for the pot and pole cap can be used as well; for example, the pot needn't be cylinder bored, it can be square (or hexagonal) and made from drawn steel, thus giving rise to non-circular magnetic (voice coil) gaps. The voice coils would then be on a square (or hexagonal) voice coil former. It is the flexibility of CNC machining which gives rise to this flexibility of design. To summarize then, changes can be made without departing from the true spirit and scope of the present invention, which is accordingly to be limited only by the following claims.

What is claimed is:

1. A compression driver transducer motor assembly having a magnetic gap for exciting a voice coil, comprising:
   a pot having an integral top plate and a cylinder bore having an inside surface,
   said integral top plate defining an outer edge of a magnetic gap,
   wherein said cylinder bore inside surface includes a groove to define an integral top plate inside surface length, said cylinder bore inside surface including a portion opposite the integral top plate and adjacent the groove,
   a magnet affixed within said pot, and
   a pole cap affixed to said magnet, said pole cap having a selected thickness being equal to said integral top plate inside surface length and having an outer surface, defining an inner edge of said magnetic gap.

2. A method for fabricating a compression driver motor assembly, comprising:
   placing and bonding a magnet in a pot having an integral top plate;
   placing a gap gauge in the pot;
   placing a pole cap within the gap gauge, thereby centering said pole cap; and
   bonding the pole cap onto said magnet.

3. The method of claim 2, further comprising removing the gap gauge.

4. The method of claim 2, wherein bonding the pole cap includes adhesive bonding.

5. The method of claim 2, wherein said pot is cylinder bored.

6. A method for fabricating a compression driver motor assembly, comprising:
   casting a pot with an integral top plate;
   cylinder boring the pot;
   machining an undercut groove under said integral top plate to define an inside surface of a chosen length;
   placing a magnet in said pot;
   placing a gap gauge in said pot;
   placing a pole cap within said gap gauge, thereby centering said pole cap and;
   bonding the pole cap onto said magnet.

7. The method of claim 6, further comprising removing the gap gauge.

8. A method for fabricating a compression driver motor assembly, comprising:
   providing a cup-shaped, one piece pot and integral top plate including an interior cylinder bore;
   machining an undercut groove into said interior cylinder bore under said integral top plate;
   bonding a magnet in said interior bore;
   placing a gap gauge in said interior bore;
   placing a pole cap within said gap gauge, thereby centering said pole cap; and
   bonding said pole cap onto said magnet.

9. The method of claim 8, wherein said machining step comprises computer numerically controlled machining.

* * * * *